United States Patent
Salmon-Legagneur et al.

(10) Patent No.: US 12,541,882 B2
(45) Date of Patent: Feb. 3, 2026

(54) METHODS AND APPARATUSES FOR ENCODING, DECODING AND RENDERING 6DOF CONTENT FROM 3DOF+ COMPOSED ELEMENTS

(71) Applicant: InterDigital VC Holdings, Inc., Wilmington, DE (US)

(72) Inventors: Charles Salmon-Legagneur, Rennes (FR); Charline Taibi, Chartres de Bretagne (FR); Jean Le Roux, Rennes (FR); Serge Travert, Dinan (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 303 days.

(21) Appl. No.: 17/785,542

(22) PCT Filed: Dec. 18, 2020

(86) PCT No.: PCT/US2020/065990
§ 371 (c)(1),
(2) Date: Jun. 15, 2022

(87) PCT Pub. No.: WO2021/127419
PCT Pub. Date: Jun. 24, 2021

(65) Prior Publication Data
US 2023/0032599 A1    Feb. 2, 2023

(30) Foreign Application Priority Data
Dec. 19, 2019    (EP) .................................... 19306692

(51) Int. Cl.
G06T 9/00    (2006.01)
(52) U.S. Cl.
CPC ........ G06T 9/001 (2013.01); *G06T 2219/028* (2013.01)

(58) Field of Classification Search
CPC . G06T 9/001; G06T 2219/028; H04N 19/136; H04N 19/137; H04N 19/184; H04N 19/115; H04N 19/46; H04N 19/597
See application file for complete search history.

(56) References Cited

U.S. PATENT DOCUMENTS

| | | |
|---|---|---|
| 10,044,944 B2 | 8/2018 | Adsumilli et al. |
| 2012/0195370 A1 | 8/2012 | Guerrero |

(Continued)

FOREIGN PATENT DOCUMENTS

| | | |
|---|---|---|
| CN | 103503454 A | 1/2014 |
| CN | 108353156 A | 7/2018 |

(Continued)

OTHER PUBLICATIONS

Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.

(Continued)

*Primary Examiner* — Jianxun Yang
(74) *Attorney, Agent, or Firm* — Condo Roccia Koptiw LLP

(57) ABSTRACT

A volumetric content is encoded as a set of clusters by an encoder and transmitted to a decoder which retrieves the volumetric content. Clusters common to different viewpoints are obtained and mutualized. Clusters are projected onto 2D images and encoded as independent video streams. Reduction in visual artefacts and reduction of data for storage and streaming are achieved.

12 Claims, 9 Drawing Sheets

(56) References Cited

U.S. PATENT DOCUMENTS

| | | |
|---|---|---|
| 2013/0336582 A1 | 12/2013 | Dai |
| 2018/0060700 A1* | 3/2018 | Bleyer ................... G06T 7/10 |
| 2018/0063505 A1 | 3/2018 | Lee et al. |
| 2018/0075634 A1 | 3/2018 | Kandler |
| 2018/0262684 A1 | 9/2018 | Lowry et al. |
| 2018/0309927 A1 | 10/2018 | Tanner et al. |
| 2018/0316902 A1 | 11/2018 | Tanaka |
| 2019/0313081 A1 | 10/2019 | Oh |

FOREIGN PATENT DOCUMENTS

| | | | |
|---|---|---|---|
| CN | 109644262 A | 4/2019 | |
| EP | 3429210 A1 * | 1/2019 | ............ H04N 19/20 |
| EP | 3457688 A1 | 3/2019 | |
| EP | 3547703 A1 * | 10/2019 | ........... H04N 13/161 |
| EP | 3562159 A1 | 10/2019 | |
| JP | 2013257843 A | 12/2013 | |
| WO | 2017082079 A1 | 5/2017 | |
| WO | 2019195547 A1 | 10/2019 | |

OTHER PUBLICATIONS

Rhee et al., "MR360: Mixed Reality Rendering for 360° Panoramic Videos", Institute of Electrical and Electronics Engineers (IEEE), IEEE Transactions on Visualization and Computer Graphics, vol. 23, Issue: 4, Apr. 2017, 10 pages.

Anonymous, "High Efficiency Video Coding", ITU-T Telecommunication Standardization Sector of Itu, Series H: Audiovisual and Multimedia Systems, Infrastructure of audiovisual services—Coding of moving video, Recommendation ITU-T H.265, Feb. 2018, pp. 1-692.

Anonymous, "Information Technology—Coding of Audio-Visual Objects—Part 10: Advanced Video Coding", International Standard, ISO/IEC 14496-10, Second Edition, Oct. 1, 2004, 280 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

Anonymous, "Terminal Equipment and Protocols for Telematic Services", Information Technology—Digital Compression and Coding of Continuous-Tone Still images—Requirements and Guidelines, International Telecommunication Union (ITU), The International Telegraph and Telephone Consultative Committee (CCITT), Document: T.81, Sep. 1992, 186 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, 680 pages.

* cited by examiner

METHODS AND APPARATUSES FOR ENCODING, DECODING AND RENDERING 6DOF CONTENT FROM 3DOF+ COMPOSED ELEMENTS

CROSS REFERENCE TO RELATED APPLICATIONS

This application is a U.S. National Stage Application under 35 U.S.C. 371 of International Patent Application No. PCT/US2020/065990, filed Dec. 18, 2020, which is incorporated herein by reference in its entirety.

This application claims the benefit of European Patent Application No. 19306692.5, filed Dec. 19, 2019, which is incorporated herein by reference in its entirety.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (known as 3DoF+) restricts the user viewing space to a limited volume called viewing bounding box, allowing limited translation of the head and parallax experience. This second context is a valuable trade-off between free navigation and passive viewing conditions of a seated audience member.

However, rendering artefacts, such as zones with missing information, may appear during a 3DOF+ volumetric rendering experience. There is a need to reduce rendering artefacts.

In a 3DoF+ rendering experience, the user may move the viewpoint within the viewing bounding box. This is achieved by encoding the 3D scene from multiple viewpoints within the viewing bounding box. For a plurality of viewpoints within the viewing bounding box, points which are visible in 360° from these viewpoints are projected to obtain 2D projections of the 3D scene. These 2D projections are encoded using well-known video coding technologies such as HEVC (High Efficiency Video Coding) and they are transmitted over the network.

The quality of the user experience depends on the number of viewpoints which are considered when encoding the 3D scene for a given viewing bounding box. Multiplying the number of viewpoints allows for reducing artefacts.

However, by multiplying the number of viewpoints, the volume of the data load corresponding to the volumetric video is increased which impacts storage and transport.

In addition, when the user makes a move of large amplitude from a viewing bounding box to a neighbor viewing bounding box, the data associated to the neighbor viewing bounding box need to be retrieved for rendering. If the data load is high there is risk that the latency to retrieve and render the content is perceivable to the user.

There is a need to minimize the data load corresponding to 3DoF+ volumetric video while providing a seamless navigation experience to the user.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

According to one or more embodiments, there is provided a method and a device for encoding a volumetric content related to a 3D scene. The method comprises:
clustering points in the 3D scene into a plurality of clusters according to at least one clustering criterion;
projecting the clusters according to projection parameters to obtain a set of 2D images;
encoding the set of 2D images and the projection parameters in a set of data streams.

According to an embodiment, each of said 2D images is encoding is a distinct data stream. In another embodiment, a viewing box is defined in the 3D scene and wherein 2D images obtained by projecting clusters visible from two points of view within the viewing box are encoded in a same data stream. In another embodiment, two viewing boxes are defined in the 3D scene and wherein 2D images obtained by projecting clusters visible from two points of view, one within each of the two viewing boxes, are encoded in a same data stream.

The present disclosure also relates to a method and a device for decoding a 3D scene. The method comprises:
obtaining at least one 2D image from a set of data streams, a 2D image being representative of a projection according to projection parameters of at least one cluster of points in the 3D scene, said points in the cluster of points meeting at least one clustering criterion;
un-projecting pixels of the at least 2D image according to the projection parameters and to a point of view in the 3D scene.

In an embodiment, the method further comprises obtaining metadata comprising:
a list of the viewing boxes defined in the 3D scene; and
for a viewing box, a description of data streams encoding 2D images representative of clusters of 3D points visible from points of view of the viewing box;
decoding 2D images from data streams comprising clusters of 3D points visible from said point of view.

The present disclosure also relates to a medium having stored therein instructions for causing at least one processor to perform at least the steps of the encoding method, and/or the decoding method, and/or the rendering method, and/or the receiving method as presented above.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
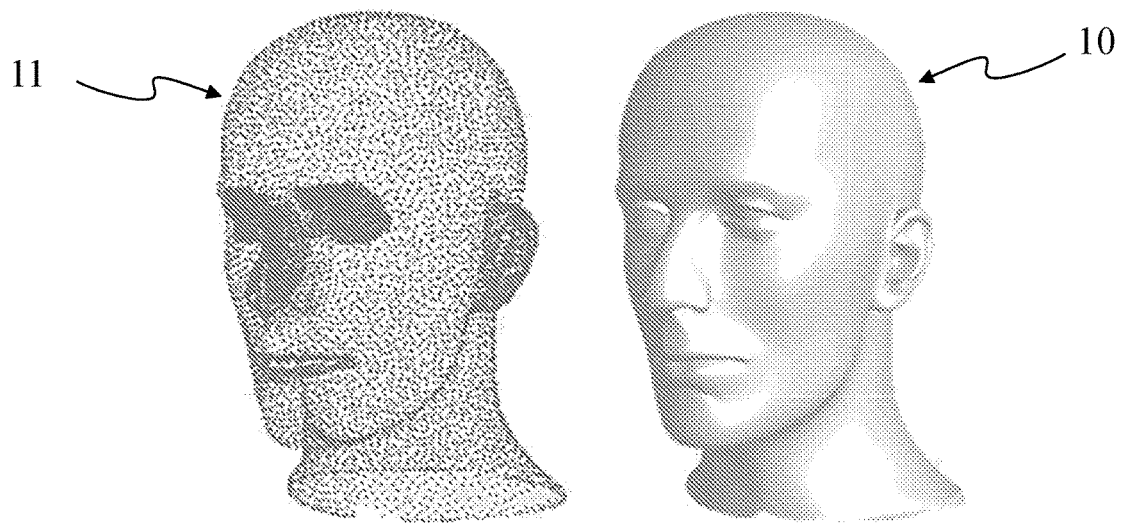
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles will be described in reference to particular embodiments of a method for encoding a volumetric content related to a 3D scene in a stream, a method for decoding such volumetric content from the stream, and a method for a volumetric rendering of a volumetric content decoded according to the mentioned decoding method.

According to a non-limiting embodiment, a method of structuring volumetric information related to a 3D scene to be encoded, and/or transmitted (for example streamed), and/or decoded/and/or rendered, based on a clustering of points of the 3D scene is disclosed. In order to capture the 3D scene, the 3D space is organized in viewing bounding boxes referred to as 3DoF+ viewing bounding boxes. Clusters common to different 3DoF+ viewing bounding boxes are obtained. Volumetric contents for the 3DOF+ viewing bounding boxes are encoded using the clusters. 6DoF volumetric rendering experience is achieved by successive 3DoF+ volumetric rendering experiences.

Advantages of the present principles for encoding, transmission, reception and rendering will be presented in the following description by reference to the figures.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
  from a capture of a real object shot by a rig of cameras, optionally complemented by depth active sensing device;
  from a capture of a virtual/synthetic object shot by a rig of virtual cameras in a modelling tool;
  from a mix of both real and virtual objects.

Figure 2:
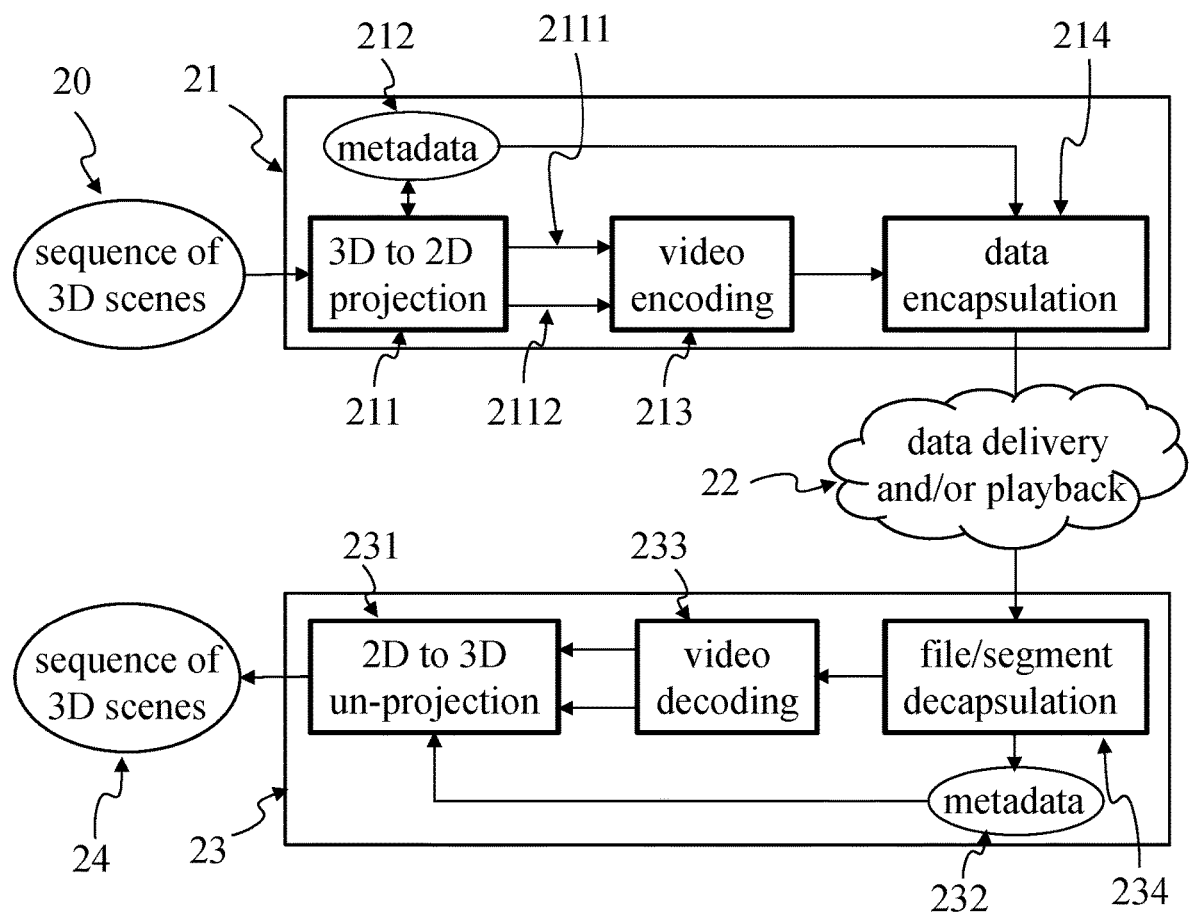
FIG. 2 shows an example of an encoding device, a transmission medium and a decoding device for the encoding, the transmission and the decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory and/or on an electronic data medium and may be transmitted over a network 22. The bit stream representative of a sequence of 3D scenes may be read from a memory and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. The selected and used projection method may be represented and encoded as a set or a list of projection parameters. Projection circuit 211 provides at least one two-dimensional image 2111 for a 3D scene of sequence 20. Image 2111 comprises color information and depth information representative of the 3D scene projected onto image 2111. In a variant, color information and depth information are encoded in two separate images 2111 and 2112.

Metadata 212 are used and updated by projection circuit 211. Metadata 212 comprise information about the projection operation (e.g. projection parameters) and about the way color and depth information is organized within images 2111 and 2112 as described in relation to FIGS. 5 to 7.

A video encoding circuit 213 encodes sequence of images 2111 and 2112 as a video. Images of a 3D scene 2111 and 2112 (or a sequence of images of the 3D scene) are encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extracting data encoded in the data stream. Circuit 234 takes a data stream as input and provides metadata 232 corresponding to metadata 212 encoded in the stream and a two-dimensional video. The video is decoded by a video decoder 233 which provides a sequence of images. Decoded images comprise color and depth information. In a variant, video decoder 233 provides two sequences of images, one comprising color information, the other comprising depth information. A circuit 231 uses metadata 232 to un-project color and depth information from decoded images to provide a sequence of 3D scenes 24. Sequence of 3D scenes 24 corresponds to sequence of 3D scenes 20, with a possible loss of precision related to the encoding as a 2D video and to the video compression.

The principles disclosed herein relate to encoder 21 and more particularly to projection circuit 211 and metadata 212. They also relate to decoder 23, and more particularly to un-projection circuit 231 and metadata 232.

Figure 3:
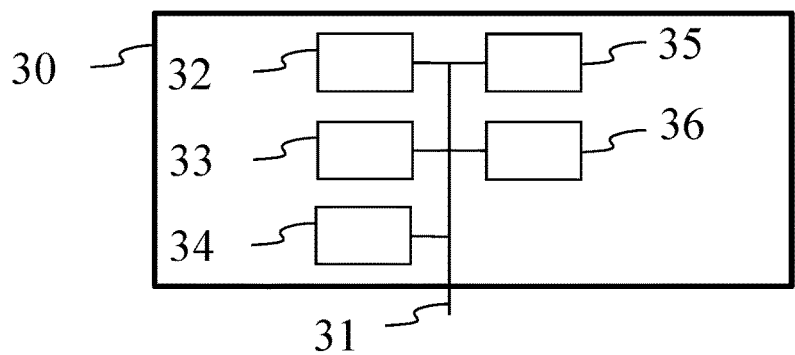
FIG. 3 shows an example architecture of an encoding and/or decoding device which may be configured to implement an encoding and/or decoding method described in relation with FIGS. 14 and 15, according to a non-limiting embodiment of the present principles.
Figure 14:
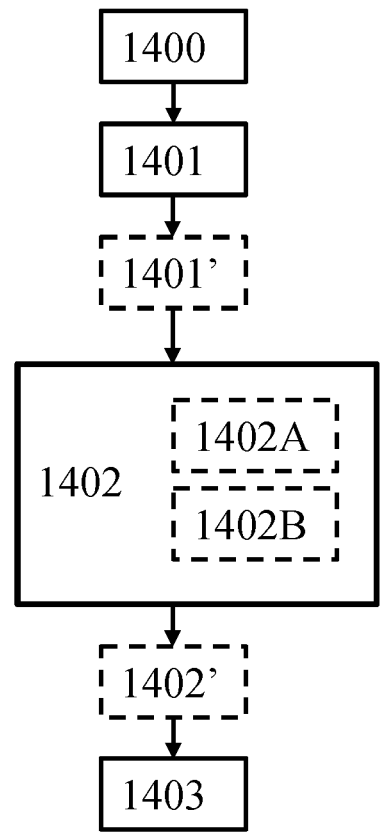
FIG. 14 illustrates a method for encoding volumetric content related to a 3D scene according to a non-restrictive embodiment of the present principles.
Figure 15:
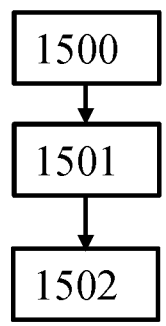
FIG. 15 illustrates a method for decoding a volumetric content related to 3D scene according to a non-restrictive embodiment of the present principles.

FIG. 3 shows an example architecture of a device 30 which may be configured to implement a method described in relation with FIGS. 14 and 15. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 14 and 15, and belongs to a set comprising:
- a mobile device;
- a communication device;

a game device;
a tablet (or tablet computer);
a laptop;
a still picture camera;
a video camera;
an encoding chip;
a server (e.g. a broadcast server, a video-on-demand server or a web server).

Figure 4:
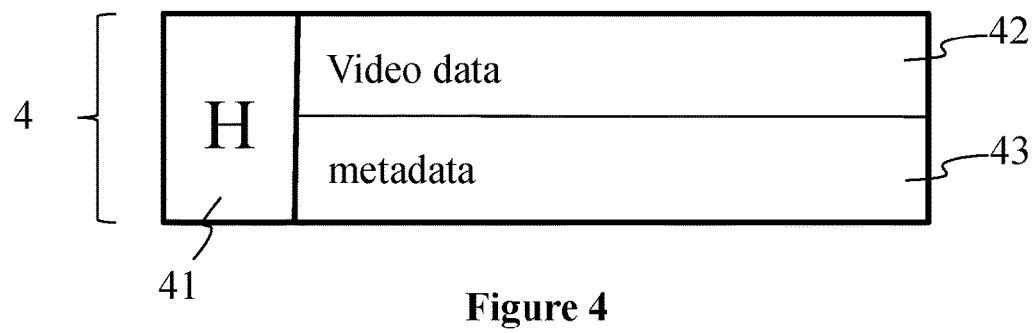
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream, for one viewing bounding box. Structure 4 organizes the stream in independent elements of syntax. In this example, structure 4 comprises three elements of syntax 41, 42 and 43. Element of syntax 41 is a header containing data common to all elements of syntax of structure 4. For example, the header 41 comprises metadata, describing the nature and the role of each element of syntax of structure 4. The header part 41 also comprises part of metadata 212 of FIG. 2, for example information relating to the position of the viewing bounding box (for example the central viewpoint of the viewing bounding box).

Structure 4 includes a payload comprising an element of syntax 42 and at least one element of syntax 43. Element of syntax 42 comprises encoded video data for example data representative of the color and depth images 2111 and 2112.

Element of syntax 43 comprises metadata about how images 2111 and 2113 are encoded, in particular parameters used for projecting and packing points of a 3D scene onto images. Such metadata may be associated with each image of the video or to group of images (also known as Group of Pictures (GoP) in video compression standards).

As mentioned previously, rendering artefacts, such as zones with missing information, may appear during a volumetric rendering experience. An example of missing information is parallax information. For example in the case of 3DoF+ volumetric rendering, the viewing space is restricted to a limited volume called viewing bounding box. A central viewpoint is attached to each viewing bounding box. When a user does a translational movement from the central viewpoint of a viewing bounding box and inside the viewing bounding box, parts of the 3D scene which were initially occulted become visible. This is called the parallax effect and the data associated with the occulted parts are called parallax data. In order to render these occulted parts when the user moves, the parallax data shall be encoded and transmitted. Depending on how data are encoded, some parallax data may be missing resulting in a degraded rendering experience. The parallax effect will be described in more details in relation to FIG. 5, FIG. 6 and FIG. 7.

Figure 5:
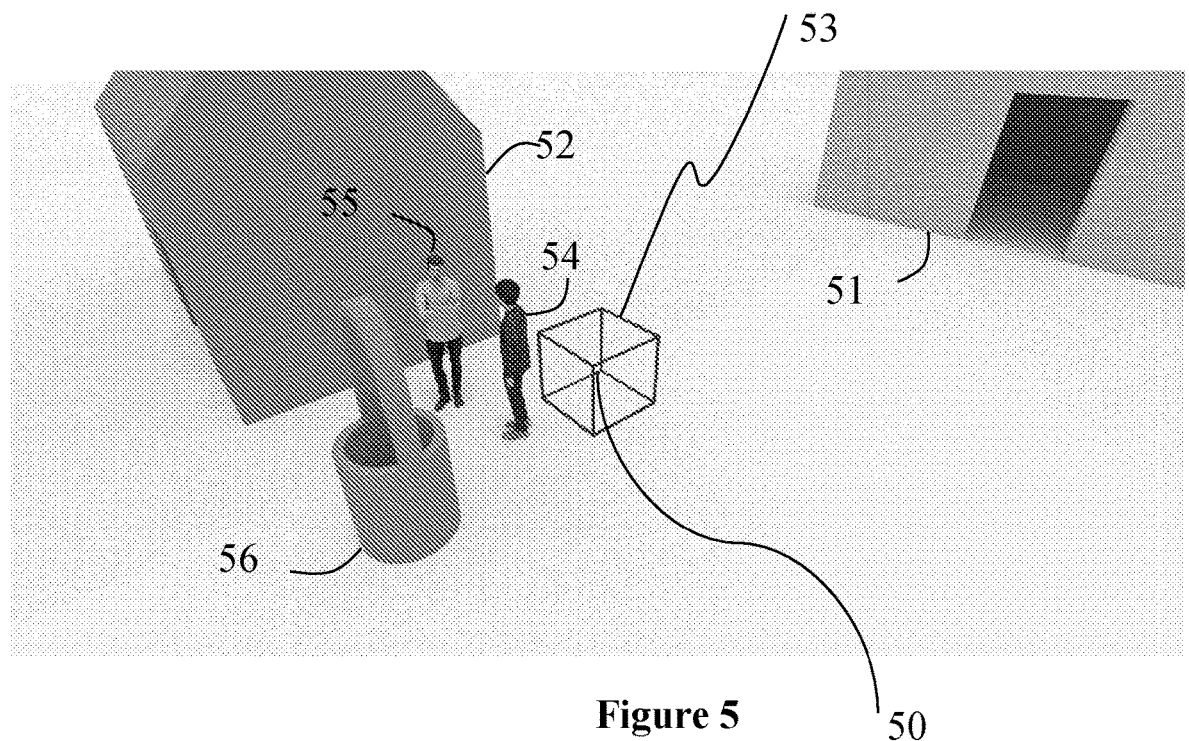
FIG. 5 shows a 3D scene comprising several objects.

FIG. 5 shows an image representing a 3D scene. The 3D scene can be captured using any suitable technology. The example 3D scene illustrated in FIG. 5 comprises several objects: houses 51 and 52, characters 54 and 55, and a well 56. A cube 53 is depicted in FIG. 5 to illustrate a viewing bounding box from which a user is likely to observe the 3D scene. The central viewpoint of viewing bounding box 53 is referred to as 50.

Figure 6:
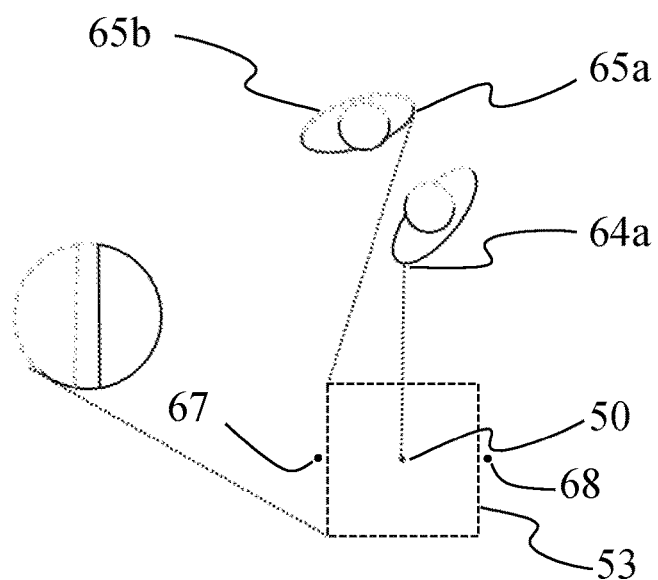
FIG. 6 illustrates the concept of 3 DoF+ viewing bounding box in a three-dimensional space where a 3D scene takes place, in relation to 3DoF+ rendering.

FIG. 6 illustrates, in more details, the concept of the viewing bounding box when rendering the 3D scene of FIG. 5 on an immersive rendering device (e.g. a cave or a Head Mounted Display device (HMD)). Scene point 64a of the 3D scene corresponds to the elbow of character 54. It is visible from viewpoint 50 as no opaque object lays between viewpoint 50 and scene point 64a. On the contrary, scene point 65a corresponding to the elbow of character 55 is not visible from viewpoint 50 as it is occulted by points of character 54. In 3DoF+ rendering, a user may change viewpoint within a 3DoF+ viewing bounding box, as described previously. For example, a user may move his viewpoint within viewing bounding box 53 and experience parallax as illustrated in relation to FIG. 7.

Figure 7:
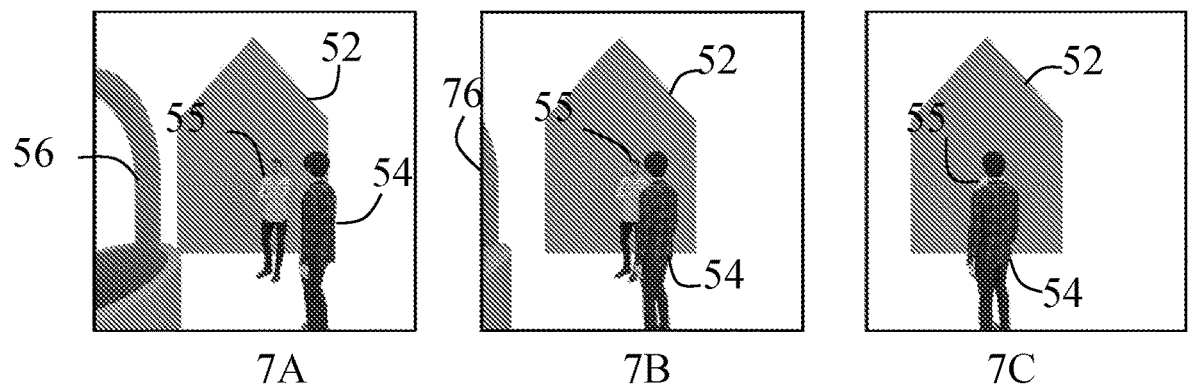
FIG. 7 illustrates the parallax experience that is allowed by volumetric rendering.

FIG. 7 illustrates the parallax experience that is allowed by volumetric rendering for the 3D scene of FIG. 5. FIG. 7B illustrates the part of the 3D scene a user can see from central viewpoint 50. From this viewpoint, the characters 54 and 55 are in a given spatial configuration, for example, the left elbow of character 55 is hidden by the body of character 54 while his head is visible. When the user is rotating his head in the three degrees of freedom around central viewpoint 50, this configuration does not change. If the viewpoint is fixed, the left elbow (referred to as 65a in FIG. 6) of character 55 is not visible. FIG. 7A illustrates the same 3D scene from a first peripheral viewpoint (referred to as 67 in FIG. 6) to the left of viewing bounding box 53. From viewpoint 67, point 65a is visible due to the parallax effect. This is called a de-occultation effect. For instance, by moving from viewpoint 50 to viewpoint 67, point 65a is de-occulted. FIG. 7C illustrates the same 3D scene observed from a second peripheral viewpoint (referred to as 68 in FIG. 6) to the right of viewing bounding box 53. From viewpoint 68, character 55 is almost entirely hidden by character 54, whereas he was still visible from viewpoint 50. Referring to FIG. 6, it can be understood that point 65b is occulted by moving from viewpoint 50 to viewpoint 68.

Figure 8:
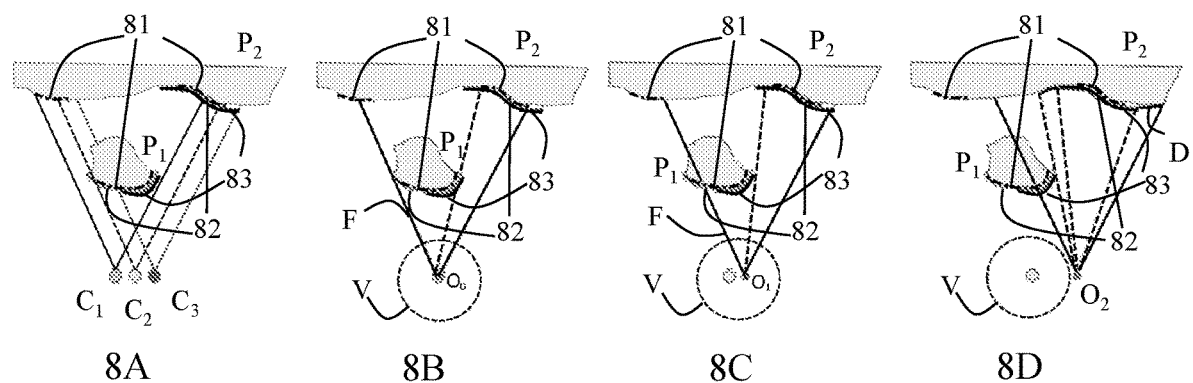
FIG. 8 illustrates the parallax experience and the de-occultation effect.

Very often, the de-occulted data corresponds to small patches of data. FIG. 8 illustrates the de-occultation data required for volumetric rendering. FIG. 8A is a top view of a 3D scene comprising two objects $P_1$ and $P_2$, captured by three virtual cameras: a first peripheral camera $C_1$, a central camera $C_2$ and a second peripheral camera $C_3$ associated with a viewing bounding box V. The viewing bounding box V is centred on the position of central camera $C_2$. The points visible from virtual cameras $C_1$, $C_2$ and $C_3$ are represented by lines 81, lines 82, and lines 83 respectively. FIGS. 8B, 8C and 8D illustrate the rendering of the 3D scene captured as explained in relation to FIG. 8A. In FIGS. 8B and 8C, the cone F delimits the field of view as well as the parts of the 3D scene visible from viewpoints $O_0$ and $O_1$ respectively. $O_0$ and $O_1$ are viewpoints included in viewing bounding box V. By moving from viewpoint $O_0$ to viewpoint $O_1$, a user experiences parallax. The de-occultation points represent small patches in the background objects.

In FIG. 8D, $O_2$ represents a viewpoint, outside of viewing bounding box V. From viewpoint $O_2$, new data not visible from viewing bounding box V, represented by segment D, are now visible and un-masked. This is the de-occultation effect. Segment D does not belong to the volumetric content associated with viewing bounding box V. When a user makes a move of large amplitude such as going from viewpoint $O_0$ to viewpoint $O_2$, and goes outside viewing bounding box V, it can lead to uncompensated de-occultation effects in different areas of the 3D scene. The parts that are un-masked can represent a large area of missing information highly visible on a rendering device, resulting in poor immersive experience.

The way of structuring the information of a volumetric content to be encoded influences the encoding efficiency, as will be seen below.

Figure 9:
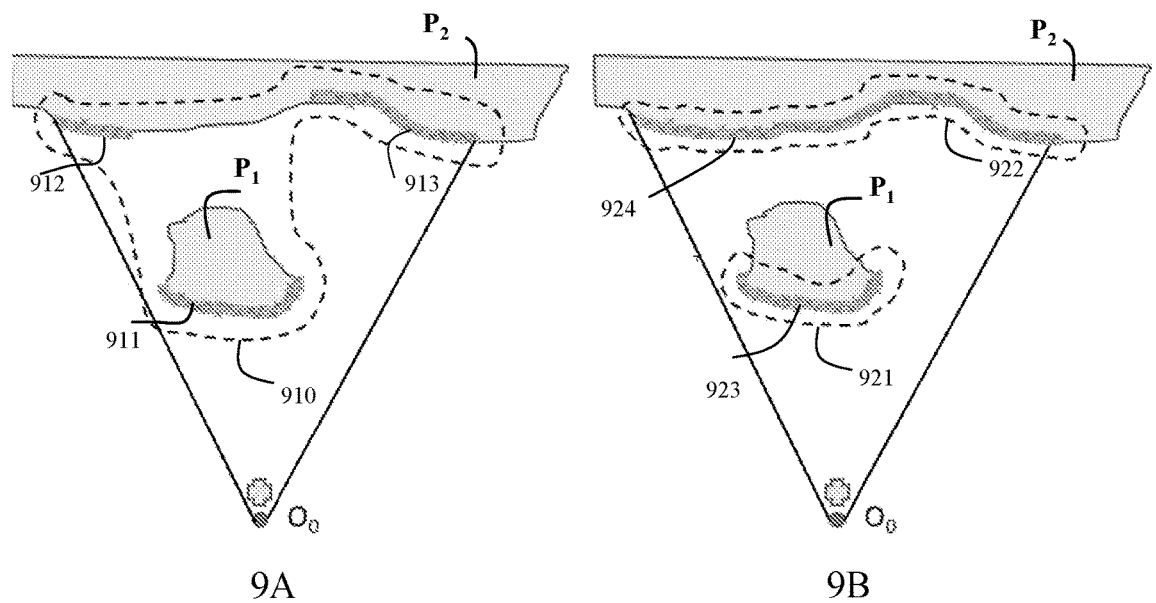
FIG. 9 illustrates a method for structuring volumetric information according to a non-limiting embodiment of the present principles.

FIG. 9A illustrates a first method for structuring volumetric information representing a 3D scene, and FIG. 9B illustrates a method for structuring the same volumetric information according to a non-limiting embodiment of the present principles, for the 3D scene of FIG. 8.

According to the first method, a unique element encompassed in a closed dotted line 910 is captured from viewpoint $O_0$. In practice, the only data accessible are the data represented by thick lines 911, 912 and 913. It can be observed that the areas of object $P_2$ occulted by object $P_1$ are not accessible, i.e., areas of $P_2$ are missing.

In the present principles, points in the 3D scene are clustered according to a clustering criterion. In the embodiment depicted in FIG. 9B, the clustering criterion relates to the depth range of the points in the 3D scene, and, consequently separates the 3D scene into a plurality of depth layers. This allows, for example, for creating background clusters and foreground clusters, which include parts of physical objects that participate to the background and respectively the foreground of the scene. Alternatively or in combination, the clustering is based on a semantic classification of the points, and/or a motion classification, and/or a color segmentation, for example. All points in a cluster share the same property. In FIG. 9B, two clusters encompassed in closed dotted lines 921 and 922 respectively, are obtained. The data accessible, represented by thick lines 923 and 924 are different from those obtained with the first method as illustrated in FIG. 9A. In FIG. 9B, all information related to object $P_2$ is available, even the information behind the object P1 as viewed from viewpoint $O_0$. It is not the case with the method described in relation to FIG. 9A. Structuring the volumetric information representing a 3D scene by clustering points according to the present principles allows for increasing the information available to render the 3D scene. Referring back to the parallax experience previously described, one advantage of the clustering method described above is that data relating to occulted areas are accessible whatever the viewpoint.

Figure 10:
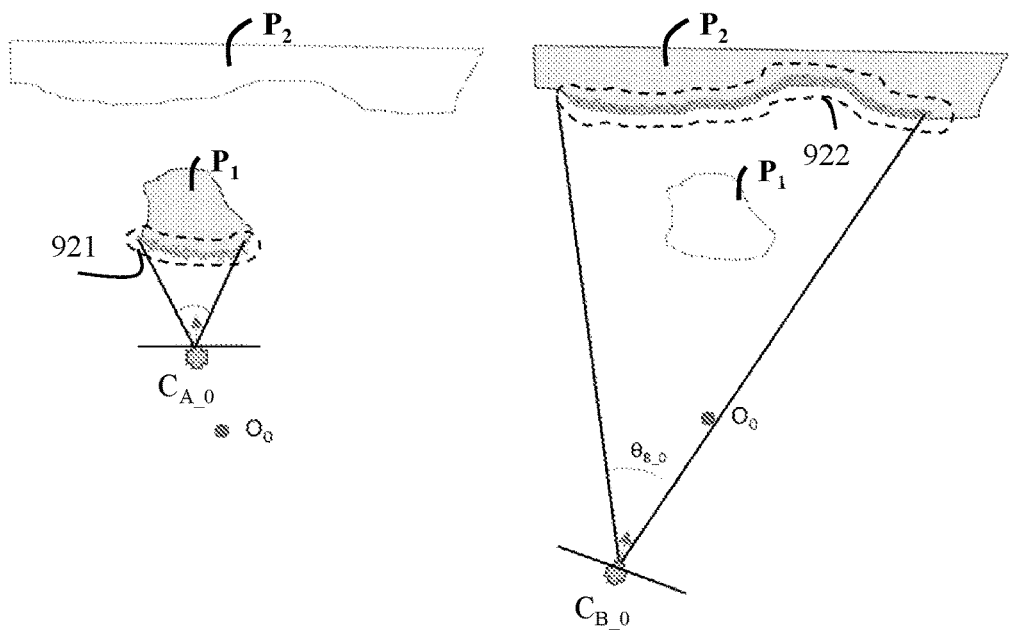
FIG. 10 shows an example of a method used to cluster a 3D scene into a plurality of clusters of points, according to a non-limiting embodiment of the present principles.

FIG. 10 illustrates a way of obtaining the clusters 921 and 922. This example refers to the case where the clustering criterion is a depth filtering criterion. One method to obtain the clusters is to capture points by means of virtual cameras with different positions, orientations and fields of view. Each virtual camera is optimized to capture as many points as possible of a given cluster. For instance, in FIG. 10, cluster 921 may be captured with virtual camera $C_{A\_0}$. Virtual camera $C_{A\_0}$ captures all pixels in a close depth range, clipping object $P_2$ which does not belong to the close depth range. Cluster 922 may be captured with virtual camera $C_{B\_0}$. Virtual camera $C_{B\_0}$ captures all pixels in a far depth range, clipping object $P_1$ which does not belong to the far depth range. Advantageously background clusters are acquired with virtual cameras positioned at far distances, independently from the viewpoints and the viewing bounding boxes, whereas foreground clusters are acquired with virtual cameras positioned at different viewpoints in the viewing bounding boxes. Mid-depth clusters are typically acquired with virtual cameras positioned at a fewer number of viewpoints in the viewing bounding boxes compared to foreground clusters.

It will be now explained how the volumetric information representative of a 3D scene, structured by a points clustering method as described previously, can be encoded in a video stream.

Figure 11:
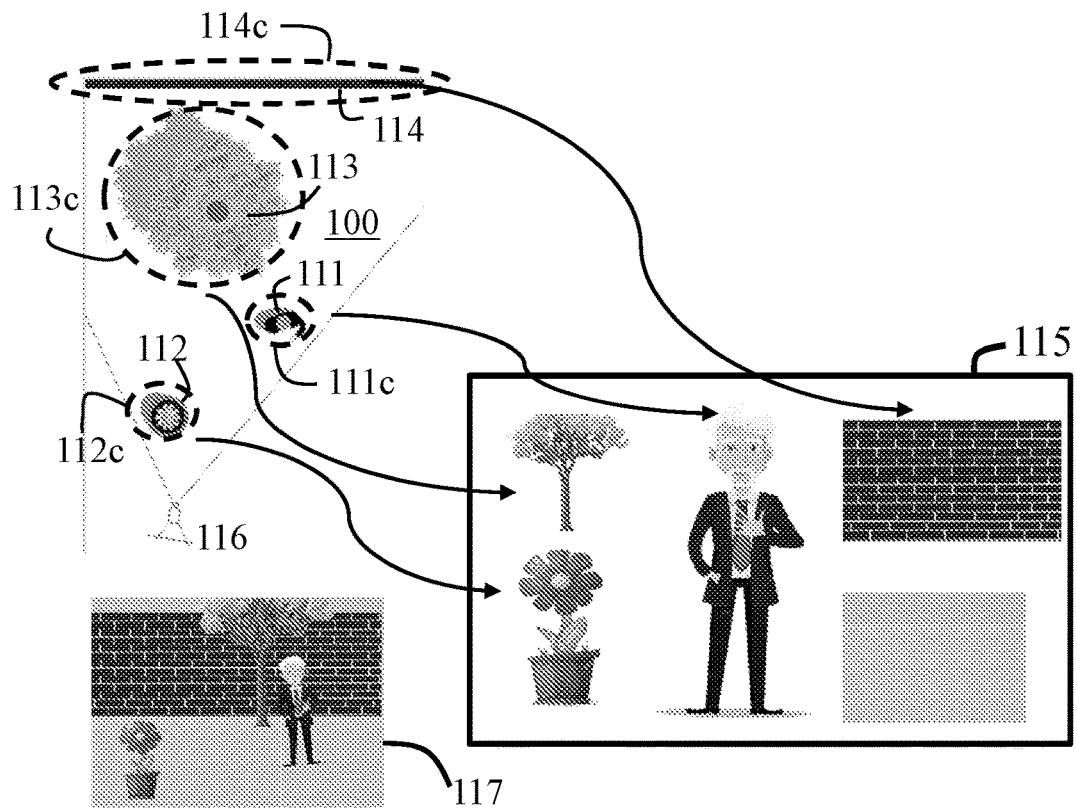
FIG. 11 shows a 2D parametrization of a 3D scene, according to a non-restrictive embodiment of the present principles.

FIG. 11 illustrates a 2D atlas approach used to encode a volumetric content representative of a 3D scene for a given viewpoint 116. In FIG. 11, a top view 100 of a 3D scene is shown. The 3D scene comprises a character 111, a flower pot 112, a tree 113, a wall 114. Image 117 is the image representative of the 3D scene as observed from viewpoint 116. With the points clustering method, clusters represented by dotted ellipses 111c, 112c, 113c and 114c are obtained from the volumetric content and projected in the direction of viewpoint 116 to create a set of 2D images. Then the set of 2D images is packed to form an atlas 115 (an atlas is a gathering of 2D images). The organization of the 2D images within the atlas defines the atlas layout. In an embodiment, two atlases with identical layout are used, one for color (or texture) information and one for depth information.

A temporal series of 2D atlases is generated for successive points in time. Typically, the temporal series of 2D atlases is transmitted in the form of a set of encoded videos, where each video corresponds to a specific cluster: each image in the video corresponds to a 2D image obtained by projecting this specific cluster at a given moment in time from viewpoint 116. The succession of 2D images for a specific cluster constitutes an independent video.

The points clustering method according to the present principles aims at structuring volumetric information representative of a 3D scene in a way which allows for encoding this volumetric information as a set of independent videos.

With the present principles, the 3D scene is not transmitted as one single video stream corresponding to a succession of images 117 obtained for different points in time but rather as a set of smaller independent videos corresponding to the succession of 2D images in the temporal series of 2D atlases. Each video can be transmitted independently from the others. For example different videos can be acquired by using virtual cameras having different fields of view. In another example different videos can be encoded with different image rates or different quality levels.

For example, a frequent configuration is a 3D scene where animated foreground objects move a lot compared with the background of the scene. These animated objects have their own life cycle and can advantageously be encoded with a higher image rate than the background.

Also, when the volumetric content is streamed, the quality of the videos can be adjusted to the changes of the streaming environment, video stream by video stream. For example video streams corresponding to the foreground may be encoded with a higher quality than video streams corresponding the background of the scene.

Another advantage is to allow personalization of the 3D scene in a scalable fashion, for example customization by insertion of specific object, for instance advertisements. Customization is optimized as compared to a volumetric content that would be encoded in a monolithic way.

For decoding, the 3D scene is obtained by combining the independent video streams. The 2D images corresponding to the different clusters in the 2D atlas are re-combined to compose an image representative of the 3D scene viewed from viewpoint 116. This image undergoes a 2D to 3D un-projection step to obtain volumetric data. The volumetric data are rendered during a volumetric rendering experience from a viewpoint corresponding to viewpoint 116 in a 3D rendering space.

It will be now explained how a 6DOF volumetric rendering experience based on a succession of 3DOF+ volumetric rendering experiences may benefit from using a points clustering method as previously described.

A 3D scene can be rendered by successively rendering volumetric contents associated with viewing bounding boxes and moving from one viewing bounding box to another in the 3D rendering space. Benefits in terms of data storage and transport, for example, will be highlighted below.

Figure 12:
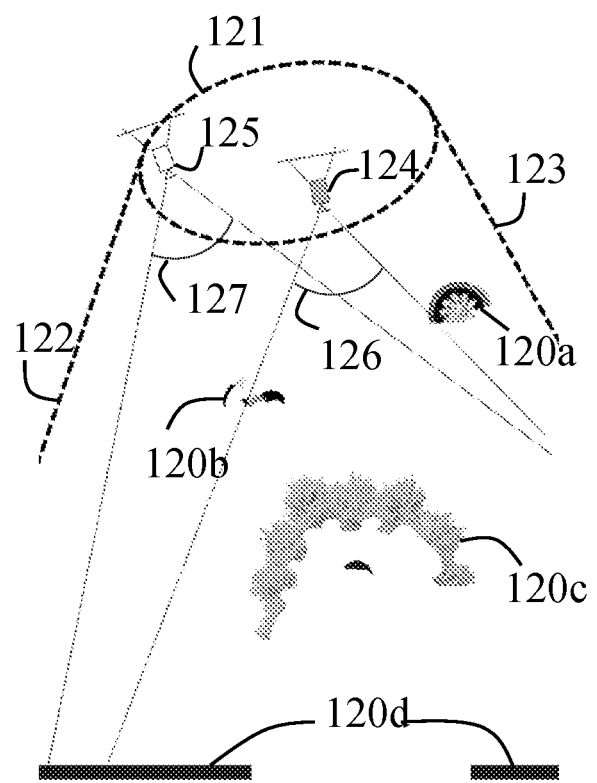
FIGS. 12 and 13 show an example of a top view of a 3D scene with clusters, according to a non-limiting embodiment of the present principles.

FIG. 12 shows a top view of the 3D scene of FIG. 11, where a viewing bounding box is represented in the form of a dotted ellipse 121. The two dotted lines 122 and 123 represent the field of view visible from viewing bounding box 121. This field of view comprises four clusters obtained by clustering points in the 3D scene of FIG. 11: a cluster 120a associated with flower pot 112, a cluster 120b associated with character 111, a cluster 120c associated with tree 113, a cluster 120d associated with wall 114.

Two viewpoints 124 and 125 comprised within viewing bounding box 121 are represented, together with their respective fields of view (represented by the two cones 126 and 127). It may be observed that some clusters or parts of some clusters are common to viewpoints 124 and 125.

In the example of FIG. 12 these common clusters are clusters 120c and 120d. In this particular example, they correspond to parts of the 3D scene at a far distance from viewpoints 124 and 125. The 2D images resulting from the 3D to 2D projection step of these common clusters are called 2D common images. The 2D images resulting from the 3D to 2D projection step of the clusters other than the common clusters are called 2D patches.

2D common images usually contain a majority of non-empty pixels. For example, when the depth criterion is used, common clusters often correspond to background points of the volumetric content and contain numerous points. Usually 2D patches are small areas that are different from the area that surrounds them. 2D patches usually contain less information than 2D common images and thus have a smaller size, in terms of number of pixels for instance. For example, clusters corresponding to foreground points of the volumetric content often contain a limited number of points representing, for instance, characters or objects placed in front of large background features.

The two atlases comprising the set of 2D images which results from the 3D to 2D projections of the sets of clusters associated with viewpoints 124 and 125 respectively, have 2D common images in common. Therefore, when moving inside viewing bounding box 121 from viewpoint 124 to viewpoint 125, or vice versa, the data corresponding to the 2D common images are already available for rendering. This leads to an improved parallax experience for the user. The latency that would otherwise be introduced to retrieve and render these data is eliminated. Another advantage is that the quantity of data to be transmitted is reduced.

Referring back to the 2D atlas approach, the 2D common images are transmitted in the form of one common video while each 2D patch is transmitted as one specific video each. Common information which was previously embedded in each image 117 is mutualized and transmitted separately in a common video. When the depth criterion is used the common videos usually correspond to clusters representing a background part of the 3D scene. A common video will be very stable over time or little varying, like the wall 114 of FIG. 11. Therefore, very efficient codecs can be used to encode the common videos, for instance by means of temporal prediction.

Figure 13:
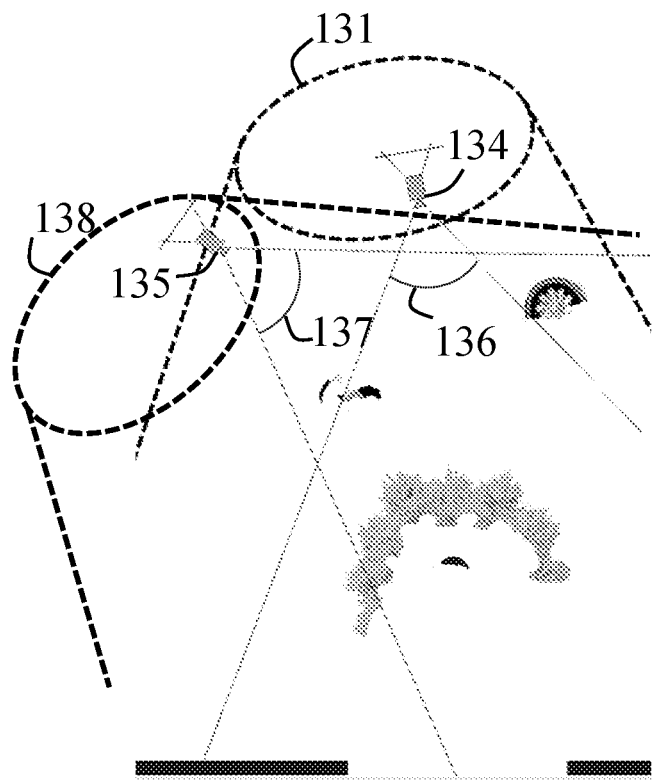

FIG. 13 shows a top view of the 3D scene of FIG. 11, where two viewing bounding boxes 131 and 138 are represented. One viewpoint 134 inside viewing bounding box 131 and one viewpoint 135 inside viewing bounding box 138 are shown. A first viewpoint 134 is located in viewing bounding box 131 and a second viewpoint 135 is located in viewing bounding box 138. The field of view from viewpoints 134 and 135 respectively are referenced 136 and 137. It can be seen that clusters or parts of clusters are common to both the fields of view 136 and 137. Thus, viewing bounding box 131 and viewing bounding box 138 have clusters or parts of clusters in common.

The 2D common images corresponding to these common clusters can be mutualized between several viewing bounding boxes. They can be stored, encoded, transmitted and rendered once, for several viewing bounding boxes. This leads to a further reduction of the data load for storage and transmission. Another advantage is the reduction of latency artefacts when the user makes a large move in the rendering space, going from a first to a second viewing bounding box.

FIG. 14 illustrates a method for encoding volumetric content related to a 3D scene according to a non-restrictive embodiment of the present principles. This method is intended to be used in encoder 21 of FIG. 2.

In a step 1400, the 3D scene is obtained from a source.

In a step 1401, points in the 3D scene are clustered into a plurality of clusters according to at least one clustering criterion. In an embodiment, the clustering criterion relates to the depth range of the points in the 3D scene, consequently separating the 3D scene into a plurality of depth layers. This allows, for example, creating background clusters and foreground clusters which include parts of physical objects that participate to the background and the foreground of the scene respectively. Alternatively or in combination, the clustering is based on a semantic classification of the points, and/or a motion classification, and/or a color segmentation, for example. For a given viewpoint, the 3D scene is described as a set of clusters.

In a step 1402, the clusters of the sets of clusters are projected according to projection parameters to obtain a set of 2D images. The 2D images are packed in an atlas, or in two atlas having the same layout. For example, one atlas contains color data and the other atlas contains depth data.

In a step 1403, a volumetric content carrying data representative of the 3D scene is generated. The data representative of the 3D scene are the atlas or the pair of atlases obtained at step 1402.

In an embodiment the 3D rendering space is organized in viewing bounding boxes, each viewing box comprising a central viewpoint and, in a preferred embodiment, peripheral viewpoints. In step 1401', clusters common to different viewing bounding boxes are obtained.

When step 1401' is implemented, step 1402 comprises two sub-steps 1402A and 1402B. In sub-step 1402A, clusters common to different viewing bounding boxes are projected according to projection parameters to obtain 2D common images. In sub-step 1002B, clusters other than clusters common to different viewing bounding boxes are projected to obtain 2D patches. This is done viewing box by viewing box. For each viewing bounding box, clusters are projected in the direction of the central point of the viewing bounding box to create a set of 2D patches. Preferably the clusters are also projected in the direction of one or more peripheral viewpoints so that additional sets of 2D patches are created (one for each peripheral viewpoint). As a result, each viewing bounding box is associated with several sets of 2D common images and 2D patches.

In step 1402', metadata are produced, including the list of the viewing bounding boxes comprised in the 3D rendering space of the 3D scene, and for a viewing bounding box in the 3D rendering space, a list of the sets of 2D common image and 2D patches that apply. The metadata produced at step 1402' are included in the volumetric content generated in step 1403. For example a structure 4 as described in FIG. 4 is used to pack the information relating to a viewing bounding box and all structures 4 for the 3D scene are packed together in a super-structure including a header containing the metadata produced at step 1402'.

For example, the metadata produced at step 1402' includes:
- a list of viewing bounding boxes in a 3D rendering space
- a list of common clusters for the 3D rendering space, each common cluster being characterized by a common cluster identifier and associated with a uniform resource identifier to be used to retrieve the corresponding video stream from the source;
- for each viewing bounding box: a list of sets of clusters representative of the 3D scene for this viewing bounding box;
- for each set of clusters associated with a viewing bounding box:
  - the identifiers of the common clusters, and
  - the list of clusters other than the common clusters with a uniform resource identifier to be used to retrieve the corresponding video stream from the source.

In an advantageous embodiment, the 2D images are encoded with different levels of quality or different image rates so that several sets of 2D images are produced for the same viewpoint. This allows for adapting the quality or the rate of the video for example to take into account the streaming environment.

FIG. 15 illustrates a method for decoding a volumetric content related to 3D scene according to a non-restrictive embodiment of the present principles. This method is intended to be used the decoder 23 of FIG. 2.

In a step 1500, the volumetric content is obtained from a source. The volumetric content comprises at least one 2D image representative of at least one cluster of points in the 3D scene. The points in the clusters meet a clustering criterion. In an embodiment, the clustering criterion relates to the depth range of the points in the 3D scene. Alternatively or in combination, the clustering criterion relates to a semantic classification, and/or a motion classification, and/or color segmentation of the points, for example.

In a step 1501, the at least one 2D image is un-projected according to projection parameters.

In a step 1502, a 3D point cloud representing the 3D scene is obtained from the un-projected 2D images.

Figure 16:
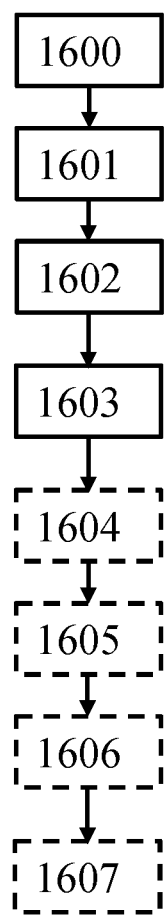
FIG. 16 illustrates a method for rendering a volumetric content related to a 3D scene according to a non-restrictive embodiment of the present principles.

FIG. 16 illustrates a method for rendering a volumetric content related to 3D scene, in a device configured to serve as a volumetric display device, or a rendering device, according to a non-restrictive embodiment of the present principles.

In a step 1600, a first viewpoint in a 3D rendering space is obtained. This first viewpoint relates to a first viewing bounding box in the 3D rendering space. When the rendering device is an HMD, the first viewpoint is the position of an end-user, obtained for example using the IMU (Inertial Measurement Unit) of the HMD. The HMD comprises one or more display screens (for example LCD (Liquid Crystal Display), OLED (Organic Light-Emitting Diode) or LCOS (Liquid Crystal On Silicon)) and sensor(s) configured for measuring the change(s) of position of the HMD, for example gyroscopes or an IMU (Inertial Measurement Unit), according to one, two or three axes of the real world (pitch, yaw and/or roll axis).

In a step 1601, a first volumetric content related to the 3D scene is received by the rendering device. The first volumetric content comprises the metadata associated with the 3D scene as described above in relation to step 1402' (list of the viewing bounding boxes comprised in the 3D rendering space and for each viewing bounding box, list of sets of the 2D common images and the 2D patches) as well as the video data and metadata associated with the first viewing bounding box.

In a step 1602, the first volumetric content is decoded using the decoding method described above, to obtain a first 3D point cloud representative of the 3D scene. Based on the metadata received at step 1601, a set of 2D common images and 2D patches corresponding to the first viewpoint is selected. The 2D images are un-projected according to the projection parameters transmitted in the stream. As a result a first 3D point cloud is obtained.

In a step 1603, the first 3D point cloud is rendered from the first viewpoint and displayed, according to a volumetric rendering.

As previously mentioned, 6DoF rendering can be enabled by the consecutive 3DoF+ rendering of several volumetric contents. To achieve this, the rendering method according to the present principles comprises the following additional steps.

In a step 1604, the user moves from a first to a second viewpoint in the rendering 3D space.

In a step 1605, the set of 2D images to be used for rendering from the second viewpoint is obtained based on the metadata retrieved at step 1601. 2D images which are not already available for rendering are retrieved from the source. 2D common images which have been previously retrieved don't need to be retrieved again.

In step 1606, the 2D images retrieved from the source are un-projected to create a second 3D point cloud. This second 3D point cloud is combined with the points of the first 3D point cloud which corresponds to the 2D images that are common between the first and the second viewing bounding boxes.

In a step 1607, the result of this combination is rendered from the second viewpoint and displayed, according to 3DoF+ volumetric rendering techniques.

Steps 1604 to 1607 can be repeated when the user moves from one viewpoint to another within the 3D scene.

The rendering method previously describes illustrates how the present principles allow 6DoF volumetric rendering based on multiple viewpoint 3DoF+ rendering by using sets of volumetric elements in the form of clusters.

Figure 17:
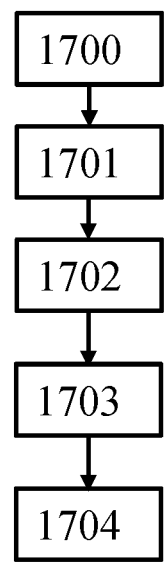
FIG. 17 illustrates a method for receiving a volumetric content related to a 3D scene, according to a non-restrictive embodiment of the present principles.

FIG. 17 illustrates a method for receiving a volumetric content related to 3D scene in a 3D rendering space, in a device configured to serve as a receiver according to a non-restrictive embodiment of the present principles. In the example of FIG. 17, the volumetric rendering experience takes place in an adaptive streaming environment. The video streams are encoded with different quality levels or different image rates. And the receiver comprises an adaptive streaming player that detects the conditions of the adaptive streaming environment and selects the video streams to be transmitted.

In a step 1700, metadata associated with the 3D scene are received by the receiver. For example, when using the DASH streaming protocol, the metadata are transmitted by using a media presentation description (MPD), also called manifest. As previously described, the metadata comprises a list of viewing bounding boxes comprised in the 3D rendering space and, for a viewing bounding box/viewpoint, information about the clusters to be used for rendering (identification of the clusters to be used and information to retrieve the clusters from the source).

In a step 1701, the adaptive streaming player detects conditions of a streaming environment, for instance the available bandwidth.

In a step 1702, a particular viewing bounding box/viewpoint in the 3D rendering space is considered. The adaptive streaming player, using the conditions of the streaming environment, selects a set in the list of sets of at least one 2D common image and at least one 2D patch. For instance, priority is given to foreground clusters so that higher quality 2D patches are selected with lower-quality 2D common images.

In a step 1703, the adaptive streaming player transmits a request for the selected set to a server.

In a step 1704, the receiver receives the selected set. Then the set is decoded and rendered according to one of the methods previously presented.

Other criterion than depth can be used in addition or as an alternative to depth, for example motion. Typically 2D patches encoding fast-moving clusters would be selected with bandwidth priority, in comparison to still clusters. Indeed, part of the 3D scene may be static while other objects may be moving at various speeds. This aspect is particularly noticeable for small animated objects (often in the foreground), which may have their own life cycle (position, color) different from other elements of the scene (often in the background). Clustering such objects, with respect to their motion speed for instance, allows transmitting them according to different transmission parameters, such as the frequency rate. An advantage is thus a reduction of the streaming costs due to content heterogeneity.

In another implementation of the present principles, the receiver comprises a prediction module to predict the next position of the user in the 3D rendering space. The corresponding set is selected based on the metadata. When several sets of clusters are available, one of them is selected as described above. Finally, the receiver sends a request to retrieve the corresponding video streams.

With the current principles, some video streams are more likely to be required, for example the background video streams which are more stable. Advantageously the receiver takes into account the probability of occurrence, and triggers retrieval of the highly probable video streams first. Foreground clusters are more versatile and also lighter to transmit. The receiver can postpone prediction and retrieval until the last acceptable moment. As a result, the cost of misprediction is reduced.

The embodiments described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a 3D scene, the method comprising:

clustering points of the 3D scene into a plurality of clusters according to a depth range of the points of the 3D scene, wherein the plurality of clusters comprises at least a background cluster and a foreground cluster;

obtaining a first set of 2D images by projecting clusters visible from a first set of points of view according to first projection parameters, wherein the first set of points of view is encompassed in a first viewing box defined in the 3D scene and comprises at least two points of view;

obtaining a second set of 2D images by projecting clusters visible from a second set of points of view according to second projection parameters, wherein the second set of points of view is encompassed in a second viewing box defined in the 3D scene different from the first viewing box;

identifying one or more common clusters visible from both the first set of points of view and the second set of points of view; and encoding the first set of 2D images and the first projection parameters in a first data stream and each 2D image of the second set of 2D images and the second projection parameters in a set of distinct data streams, wherein 2D common images corresponding to the one or more common clusters are encoded only once.

2. The method of claim 1, wherein the clustering is further based on semantics associated with points of the 3D scene, on color of the points of the 3D scene, or on motion of points of the 3D scene.

3. The method of claim 1, further comprising:
encoding metadata comprising:
  a list of viewing boxes defined in the 3D scene and a list of common clusters for the 3D scene; and
  for each viewing box, a list of sets of clusters representative of the 3D scene for the respective viewing box and, for each set of clusters associated with the viewing box, identifiers of the common clusters, and the list of clusters other than the common clusters.

4. A non-transitory computer readable medium storing instructions which, when executed by one or more processors, cause the one or more processors to perform the method of claim 1.

5. A method for decoding a 3D scene, the method comprising:
decoding a first set of first 2D images from a first data stream and a second 2D image from each data stream of a set of distinct data streams, the first 2D images being representative of a projection according to first projection parameters of at least one cluster of points of the 3D scene visible from a first set of points of view encompassed in a first viewing box defined in the 3D scene, the second 2D images being representative of a projection according to second projection parameters of at least one cluster of points of the 3D scene visible from a second set of points of view encompassed in a second viewing box defined in the 3D scene different from the first viewing box, wherein 2D common images corresponding to common clusters to the first and second viewing boxes are decoded only once, and the points of the 3D scene being clustered into a plurality of clusters according to a depth range of the points of the 3D scene, wherein the plurality of clusters comprises at least a background cluster and a foreground cluster; and
un-projecting pixels of the first 2D images according to the first projection parameters and to the first set of points of view and un-projecting pixels of the second 2D images according to the second projection parameters and to the second set of points of view.

6. The method of claim 5, further comprising
obtaining metadata comprising:
  a list of viewing boxes defined in the 3D scene and a list of common clusters for the 3D scene; and
  for each viewing box, a list of sets of clusters representative of the 3D scene for the respective viewing box and, for each set of clusters associated with the viewing box, identifiers of the common clusters, and the list of clusters other than the common clusters; and
decoding 2D images from data streams comprising clusters of 3D points visible from a current point of view.

7. A non-transitory computer readable medium storing instructions which, when executed by one or more processors, cause the one or more processors to perform the method of claim 5.

8. A device for encoding a 3D scene comprising a memory associated with a processor configured for:
clustering points of the 3D scene into a plurality of clusters according to a depth range of the points of the 3D scene, wherein the plurality of clusters comprises at least a background cluster and a foreground cluster;
obtaining a first set of 2D images by projecting clusters visible from a first set of points of view according to first projection parameters, wherein the first set of points of view is encompassed in a first viewing box defined in the 3D scene and comprises at least two points of view;
obtaining a second set of 2D images by projecting clusters visible from a second set of points of view according to second projection parameters, wherein the second set of points of view is encompassed in a second viewing box defined in the 3D scene different from the first viewing box;
identifying one or more common clusters visible from both the first set of points of view and the second set of points of view; and
encoding the first set of 2D images and the first projection parameters in a first data stream and each 2D image of the second set of 2D images and the second projection parameters in a set of distinct data streams, wherein 2D common images corresponding to the one or more common clusters are encoded only once.

9. The device of claim 8, wherein the clustering is further based on semantics associated with points of the 3D scene, on color of the points of the 3D scene, or on motion of the points of the 3D scene.

10. The device of claim 8, wherein the processor is further configured for encoding metadata comprising:
a list of viewing boxes defined in the 3D scene and a list of common clusters for the 3D scene; and
for each viewing box, a list of sets of clusters representative of the 3D scene for the respective viewing box and, for each set of clusters associated with the viewing box, identifiers of the common clusters, and the list of clusters other than the common clusters.

11. A device for decoding a 3D scene comprising a memory associated with a processor configured for:
decoding a first set of first 2D images from a first data stream and a second 2D image from each data stream of a set of distinct data streams, the first 2D images being representative of a projection according to first projection parameters of at least one cluster of points of the 3D scene visible from a first set of points of view encompassed in a first viewing box defined in the 3D scene, the second 2D images being representative of a projection according to second projection parameters of at least one cluster of points of the 3D scene visible from a second set of points of view encompassed in a second viewing box defined in the 3D scene different from the first viewing box, wherein 2D common images corresponding to common clusters to the first and second viewing boxes are decoded only once, and the points of the 3D scene being clustered into a plurality of clusters according to a depth range of the points of the 3D scene, wherein the plurality of clusters comprises at least a background cluster and a foreground cluster; and un-projecting pixels of the first 2D images according to the first projection parameters and to the first set of points of view and un-projecting pixels of the second 2D images according to the second projection parameters and to the second set of points of view.

12. The device of claim 11, further the processor is further configured for obtaining metadata comprising:

a list of viewing boxes defined in the 3D scene and a list of common clusters for the 3D scene; and for each viewing box, a list of sets of clusters representative of the 3D scene for the respective viewing box and, for each set of clusters associated with the viewing box, identifiers of the common clusters, and the list of clusters other than the common clusters; and decoding 2D images from data streams comprising clusters of 3D points visible from a current point.

\* \* \* \* \*